(12) United States Patent
Gaskins

(10) Patent No.: US 7,444,448 B2
(45) Date of Patent: Oct. 28, 2008

(54) DATA BUS MECHANISM FOR DYNAMIC SOURCE SYNCHRONIZED SAMPLING ADJUST

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 173 days.

(21) Appl. No.: 11/424,592

(22) Filed: Jun. 16, 2006

(65) Prior Publication Data

US 2007/0033313 A1 Feb. 8, 2007

Related U.S. Application Data

(60) Provisional application No. 60/705,299, filed on Aug. 3, 2005.

(51) Int. Cl.
*G06F 13/36* (2006.01)
*G06F 13/14* (2006.01)
*G06F 13/10* (2006.01)

(52) U.S. Cl. .................. 710/117; 710/305

(58) Field of Classification Search .............. 710/117
See application file for complete search history.

(56) References Cited

U.S. PATENT DOCUMENTS

| | | | | |
|---|---|---|---|---|
| 5,964,856 | A * | 10/1999 | Wu et al. | 710/110 |
| 6,336,159 | B1 * | 1/2002 | MacWilliams et al. | 710/105 |
| 6,598,103 | B2 * | 7/2003 | MacWilliams et al. | 710/105 |
| 6,678,767 | B1 | 1/2004 | Cho et al. | |
| 6,694,392 | B1 * | 2/2004 | Haren | 710/65 |
| 6,804,735 | B2 * | 10/2004 | Singh et al. | 710/112 |
| 6,807,592 | B2 * | 10/2004 | Singh et al. | 710/107 |
| 6,832,325 | B2 | 12/2004 | Liu | |
| 6,880,031 | B2 * | 4/2005 | Singh et al. | 710/305 |
| 6,907,487 | B2 * | 6/2005 | Singh et al. | 710/305 |
| 2001/0037421 | A1 * | 11/2001 | Singh et al. | 710/126 |
| 2002/0029307 | A1 * | 3/2002 | Singh et al. | 710/105 |
| 2002/0038397 | A1 * | 3/2002 | Singh et al. | 710/105 |
| 2002/0147875 | A1 * | 10/2002 | Singh et al. | 710/305 |
| 2004/0044919 | A1 | 3/2004 | Dabral | |
| 2004/0124893 | A1 | 7/2004 | Falconer et al. | |
| 2004/0170240 | A1 | 9/2004 | Radjassamy | |

FOREIGN PATENT DOCUMENTS

WO WO0148621 7/2001

* cited by examiner

*Primary Examiner*—Paul R. Myers
*Assistant Examiner*—Ryan M Stiglic
(74) *Attorney, Agent, or Firm*—Gary R. Stanford; Richard K. Huffman; James W. Huffman

(57) ABSTRACT

An integrated device for sampling data packets asserted sequentially on a system bus, including a clock input for receiving a bus clock signal, a data bus interface for receiving the data packets and for detecting at least one data strobe indicating data validity, and dynamic source synchronized sampling adjust logic. The dynamic source synchronized sampling adjust logic includes sampling logic which selects and latches each data packet in response to the data strobe and which provides latched data packets, and select logic which selects from among the latched data packets based on a read pointer. A method of sampling data packets asserted sequentially on a data bus for one or more bus clock cycles including detecting operative edges of a data strobe, selecting a data packet for each detected operative edge, and latching each selected data packet.

20 Claims, 5 Drawing Sheets

QUAD-PUMPED SOURCE SYNCHRONOUS DATA PHASE FOR 64-BYTE TRANSFER

SELECT SIGNAL GENERATION

DATA BUS MECHANISM FOR DYNAMIC SOURCE SYNCHRONIZED SAMPLING ADJUST

BACKGROUND OF THE INVENTION

1. Field of the Invention

The present invention relates to processor system buses, and more particularly to a technique for dynamically adjusting the time at which data on system bus is sampled and provided to a microprocessor core, where the time is based not upon guaranteed data valid time, but upon detection of source synchronous data strobe edges.

2. Description of the Related Art

A present day sampled data bus, such as may be employed in a microprocessor or integrated circuit (IC) device that communicates over a system bus with other devices to exchange data, receives data from the system bus via data signals. The data signals are indicated as being on the system bus via a data ready signal DRDY that is asserted by the device that is sending the data. The data and DRDY signals are typically asserted and de-asserted in synchronization with a bus clock signal BCLK. According to present day bus protocol, when the sending device drives data onto the data bus, it asserts DRDY, and the states of the data bus signal are guaranteed as being valid on the bus for sampling one cycle of the BCLK later. Accordingly, a present day microprocessor or integrated circuit that is required to receive the data must wait for one cycle of the bus clock BCLK before it samples the data.

Newer protocols for communication of data over a system bus have provided for source synchronous data strobes. The current state of the art provides for a 64-bit data bus DATA that supports transfer during the data phase of a 64-byte cache line over two cycles of a dual bus clock signal BCLK. The transfer of eight bytes over the 64-bit data bus is known as a beat and 4 beats are transferred during each cycle of the bus clock BCLK. In an x86-compatible configuration, the data bus signal group is divided into four subgroups and a pair of data strobes are provided for each data subgroup. Applicable edges (e.g., the falling edges) of each data strobe are used to indicate validity of corresponding words asserted on corresponding subgroups of data.

The present inventor has observed that if conventional techniques for sampling the data signals over a system bus as described herein are employed, disadvantages ensue. First, since four quadwords are transmitted during the BCLK cycle following transmission of another four quadwords, to wait for 1 BCLK cycle before sampling the data would result in unpredictable sampling results. Second, since data strobes are provided to indicate validity of their corresponding doublewords on the data bus, to wait 1 cycle of BCLK before sampling is disadvantageous from a performance standpoint.

It is desired to solve the problem of delay when providing received data elements from a system bus to a processor core due to protocol requirements for data valid times.

SUMMARY OF THE INVENTION

A dynamic source synchronized sampling adjust system according to an embodiment of the present invention samples data packets distributed among sequential data beats on a data bus during each of at least one cycle of a bus clock in response to at least one data strobe that is provided for indicating the validity of each data packet. In one embodiment, the dynamic source synchronized sampling adjust system includes first multiplexers, registers, at least one second multiplexer and timing logic. Each first multiplexer has a first input for coupling to the data bus, a second input receiving a corresponding latched data packet, a select input receiving a corresponding one of multiple select signals, and an output. Each register has an input coupled to an output of a corresponding first multiplexer, an output providing a corresponding latched data packet, and a clock input for receiving the data strobe. The second multiplexer has inputs coupled to respective outputs of the registers, an output providing selected latched data packets, and a select input receiving a read pointer. The timing logic has at least one input for receiving the data strobe and outputs providing the select signals.

The first multiplexers and the registers may collectively form a set of muxed-input registers, where each muxed-input register latches a corresponding data packet provided on the data bus. The timing logic may be configured to provide a corresponding select signal to a corresponding first multiplexer when a corresponding data packet is indicated as valid by the data strobe.

In one particular configuration, the data bus is subdivided into subgroups and the data packets are further distributed among the data bus subgroups. Also the data strobe includes at least one data strobe for each data bus subgroup. In this configuration, the timing logic may include multiple sequential timing circuits, each having an input receiving a corresponding data strobe and multiple outputs providing a corresponding subset of the select signals. Each select signal of each subset is provided to a corresponding first multiplexer for selecting a corresponding data packet. The data strobe signal may include a positive data strobe and a negative data strobe. The timing logic includes a sequential timing circuit for each for generating select signals for corresponding data packets. In a more specific configuration, the timing circuit may be implemented as several sequentially-coupled flip-flops which advance through a sequential series of logic states in response to each operative edge of the one or more data strobes.

The dynamic source synchronized sampling adjust system may include a core register having an input coupled to the output of the second multiplexer, an output providing synchronized latched data packets, and a clock input receiving a core clock signal. The read pointer may be synchronized with the core clock signal.

An integrated device for sampling data packets asserted sequentially on a system bus during each of one or more cycles of a bus clock signal in which the system bus includes at least one data strobe signal indicating validity of each data packet according to an embodiment of the present invention includes a clock input for receiving the bus clock signal, a data bus interface for receiving the data packets and for detecting the data strobe signal, and dynamic source synchronized sampling adjust logic. The dynamic source synchronized sampling adjust logic includes sampling logic and select logic. The sampling logic selects and latches each data packet in response to the data strobe signal and provides corresponding latched data packets. The select logic selects from among the latched data packets based on a read pointer.

The sampling logic may include multiplexers, registers and timing logic. Each multiplexer has a first input coupled to the data bus interface, a second input receiving a corresponding latched data packet, and a select input receiving a corresponding select signal. Each register had an input coupled to an output of a corresponding multiplexer, an output providing a corresponding latched data packet, and a clock input for receiving the data strobe. The timing logic has an input for receiving the data strobe and outputs for providing the select signals.

The timing logic of the integrated device may be implemented as sequentially-coupled flip-flops for detecting edges of the data strobe signal. The data strobe signal may include a first data strobe signal indicating validity of a first and every other subsequent data packet asserted sequentially on the system bus and a second data strobe signal indicating validity of a second and every other subsequent data packet asserted sequentially on the system bus. In this case, the timing logic includes first clock logic responsive to the first data strobe signal and second clock logic responsive to the second data strobe signal.

The select logic of the integrated device may be implemented as a multiplexer having inputs coupled to receive the latched data packets, an output providing selected latched data packets, and a select input receiving the read pointer. The integrated device may further include a core register having an input coupled to the output of the multiplexer, an output providing synchronized data packets, and a clock input receiving a core clock signal. In this case, the read pointer may be synchronized with the core clock signal, such as for providing synchronous data to the core of a microprocessor or the like.

The present invention further contemplates a method of sampling a plurality of data packets asserted sequentially on a data bus for each of at least one cycle of a bus clock signal, the data bus including at least one data strobe signal indicating validity of each data packet. The method includes receiving the bus clock signal and the plurality of data packets; detecting operative edges of the at least one data strobe signal; first employing sampling logic to select and latch each of the plurality of data packets in response to the at least one data strobe signal and providing a plurality of latched data packets; and second employing select logic that is coupled to the sampling logic, to select from among the plurality of latched data packets based on a read pointer.

The method may include clocking sequential logic through multiple logic states. The method may include asserting a corresponding select signal for each logic state and providing each select signal to a select input of a corresponding multiplexer coupled to the data bus. The method may include clocking a corresponding register with the data strobe signal. The method may include detecting operative edges of a positive data strobe signal and a negative data strobe signal, and clocking first sequential logic with the positive strobe signal and clocking second sequential logic with the negative strobe signal. The method may include selecting at least one latched data packet and synchronously latching the latched data packet with a core clock signal.

The data packets may be distributed among multiple subgroups of the data bus and among multiple sequential data beats for the at least one cycle of the bus clock. In this case, the at least one data strobe signal may include a separate data strobe signal for each data bus subgroup, and the method includes detecting operative edges of each data strobe signal.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present inventor has observed that if conventional techniques for sampling the data signals over a system bus, such as sampling according to a guaranteed data valid time, are employed when the system bus operates using new protocols, such as using source synchronous data strobes, substantial disadvantages ensue. The disadvantages include, for example, unpredictable sampling results and significantly reduced performance. He has therefore developed a technique for dynamically adjusting the time at which data on system bus is sampled and provided to a microprocessor core, where the time is based not upon guaranteed data valid time, but upon detection of source synchronous data strobe edges, as will be further described below with respect to FIGS. 1-5.

Figure 1:
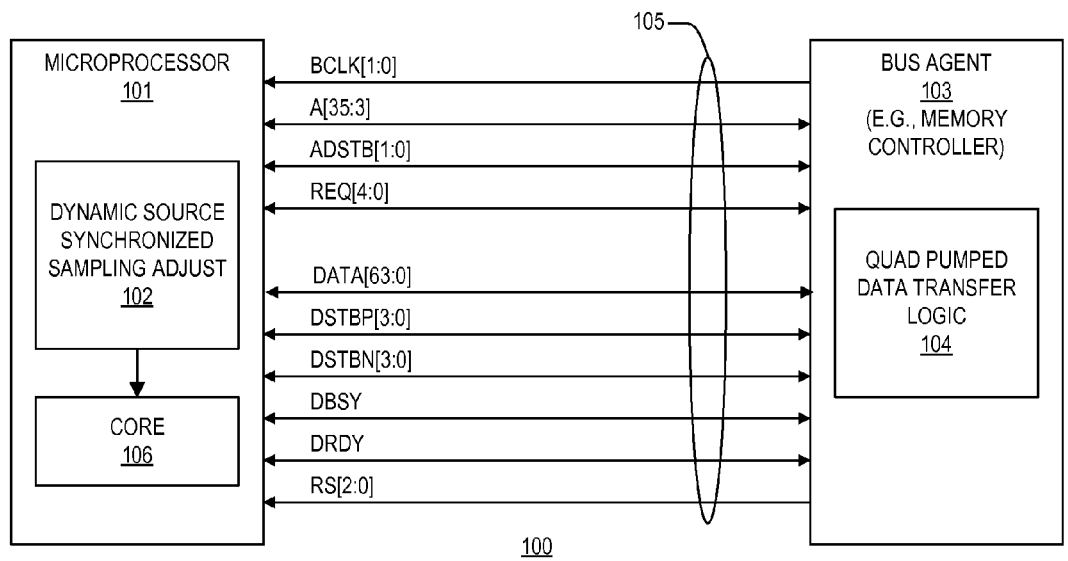
FIG. 1 is a simplified block diagram of a microprocessor interface system including a data bus mechanism for dynamic source synchronized sampling adjust implemented according to an exemplary embodiment of the present invention.

FIG. 1 is a simplified block diagram of a microprocessor interface system 100 including a data bus mechanism for dynamic source synchronized sampling adjust implemented according to an exemplary embodiment of the present invention. The microprocessor interface system 100 includes a microprocessor 101 and a bus agent 103 interfaced via a system bus 105. The bus agent 103 represents any number of different types of bus agents as known to those skilled in the art, such as a memory controller, a host/PCI (Peripheral Component Interconnect) bridge, chipset, etc. The system bus 105 includes the signals for performing data transactions, including a bidirectional address bus A, a bidirectional data bus DATA, and multiple control signals. In the illustrated embodiment, the A bus has 33 signals shown as A[35:3] and the DATA bus has 64 signals shown as DATA[63:0], although it is understood that the address and data buses may have any suitable number of signals depending upon the particular configuration and architecture. One skilled in the art will appreciate that the least significant address signals (A[2:0]) are not required to allow for transfer of data with quadword granularity, which is the present state of the art.

The control signals include a differential clock bus BCLK [1:0], a bidirectional address strobe bus ADSTB[1:0] (indicating validity of the addresses on the A bus), a bidirectional request (REQ) bus with signals REQ[4:0] specifying the type of transaction requested (e.g., memory code read, memory data read, memory line write, memory quadword write with byte enables), a pair of data strobe buses DSTBP[3:0] and DSTBN[3:0], a bidirectional data bus busy signal DBSY (asserted by the entity that is providing data on the DATA bus), a data ready signal DRDY (asserted by either the device providing data during all clock cycles that data is transferred over the DATA bus), and a response bus RS[2:0] which provides the type of transaction response (e.g., no data, normal data, implicit writeback) that is being completed over the DATA bus. In the illustrated embodiment, the RS bus has 3 signals shown as RS[2:0] and is asserted by the bus agent 103.

The signals shown for the microprocessor interface system 100 are provided in virtually all present day microprocessors with minor variation. Some processors multiplex addresses and data over the same signal group and thus provide control signals to indicate whether data or addresses are present. Other microprocessors utilize different address or data bus widths or control signals alternatively named. Still further, addresses and/or data may be multiplexed over a smaller bus size than those illustrated by the microprocessor interface system 100. What is important to note is that substantially all processors provide signals for communication with bus agents to indicate what type of transaction is requested, the parameters of that transaction, and to transmit/receive the data.

The microprocessor interface system 100 is configured to transfer data on a cache line basis (e.g., eight quadwords for a 64-byte cache line) according to a "quad-pumped" configuration. As shown, the bus agent 103 includes quad-pumped data transfer logic 104 for performing quad-pumped transactions on the system bus 105. When transferring an entire cache line, two cycles of the bus clock signals BCLK[1:0] are used to transfer the eight associated quadwords in a cache line. Accordingly, four quadwords are transferred during each cycle of the bus clock BCLK[1:0], thus accounting for the descriptor "quad-pumped." During this type of data transfer, the signals of the data strobe buses DSTBP[3:0], DSTBN[3:0] are provided to indicate the validity of various quadword beats on the data bus so that 4 beats are transferred during a single bus clock (each "beat" including the 64 bits of the DATA bus) for a total of 8 beats for two bus clock cycles. The microprocessor 101 includes dynamic source synchronized sampling adjust logic 102 implemented according to an embodiment of the present invention to receive data elements from the system bus 105 during the quad-pumped transaction and to provide the data to a microprocessor core 106 without the delay that would otherwise be caused if using conventional protocol requirements for data valid times.

Figure 2:
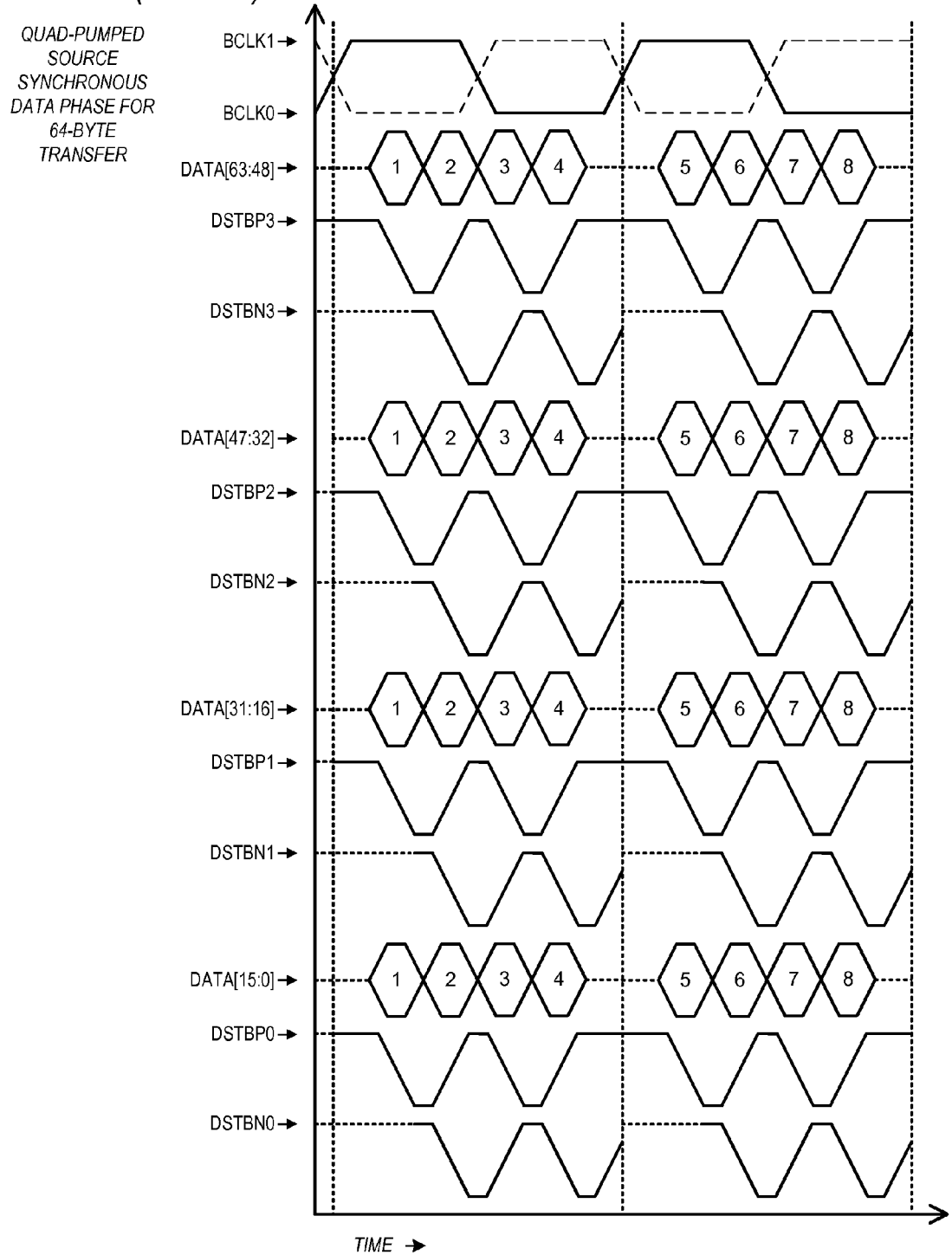
FIG. 2 is a timing diagram showing the interaction of the signals within the data signal group described with reference to the microprocessor interface system of FIG. 1 for performing the data phase of a quad-pumped data transaction.

FIG. 2 is a timing diagram showing the interaction of the signals within the data signal group described with reference to the microprocessor interface system 100 for performing the data phase of a quad-pumped data transaction. Operation of such transactions and corresponding signals as named herein in an x86-compatible microprocessor are described in numerous references, one of which is the book "The Unabridged Pentium® 4 IA32 Processor Genealogy, 1st Edition," by Tom Shanley. For clarity, assertion of the control signals is shown as a logic low level, although one skilled in the art will appreciate that assertion can be indicated as well by a logic high level. Cycles of the differential bus clock BCLK[1:0] are shown across the top of the timing diagram, in which BCLK[1] is shown using a dashed line and which toggles with opposite polarity as the BCLK[0] signal.

As noted above, the current state of the art provides for a 64-bit data bus DATA[63:0] that supports transfer during the data phase of a 64-byte cache line over two cycles of the bus clock BCLK[1:0]. The transfer of eight bytes over the 64-bit data bus is known as a beat and 4 beats 1-4, 5-8 are transferred during each cycle of the bus clock BCLK[1:0]. In an x86-compatible configuration, the data bus signal group is divided into four subgroups. Subgroup 0 includes DATA[15:0], DSTBP0, and DSTBN0; subgroup 1 includes DATA[31:16], DSTBP1, and DSTBN1; subgroup 2 includes DATA[47:32], DSTBP2, and DSTBN2; and subgroup 3 includes DATA[63:48], DSTBP3, and DSTBN3. The falling edges of DSTBP0 are used to indicate validity of data packets (e.g., words) labeled 1, 3, 5, and 7 on DATA[15:0], and the falling edges of DSTBN0 are used to indicate validity of data packets labeled 2, 4, 6, and 8 on DATA[15:0]. The falling edges of DSTBP 1 are used to indicate validity of data packets 1, 3, 5, and 7 on the DATA[31:16] signals, and the falling edges of DSTBN1 are used to indicate validity of data packets 2, 4, 6, and 8 on the DATA[31:16] signals. The falling edges of DSTBP2 are used to indicate validity of data packets 1, 3, 5, and 7 on the DATA[47:32] signals, and the falling edges of DSTBN2 are used to indicate validity of data packets 2, 4, 6, and 8 on the DATA[47:32] signals. The falling edges of DSTBP3 are used to indicate validity of data packets 1, 3, 5, and 7 on the DATA[63:48] signals, and the falling edges of DSTBN3 are used to indicate validity of data packets 2, 4, 6, and 8 on the DATA[63:48] signals. In the illustrated embodiment, each data packet 1-8 include 16 signals or bits for a data word, although it is understood that the size of each data packet may be larger or smaller in various embodiments.

The present inventor has observed that if conventional techniques for sampling the DATA[63:0] signals over the system bus 105 are employed, disadvantages ensue. First, since the data packets 5-8 (on each subgroup) are transmitted during the BCLK[1:0] cycle following transmission of data packets 1-4 (on each subgroup), to wait for 1 BCLK[1:0] cycle before sampling the DATA[63:0] signals would result in unpredictable sampling results. Secondly, since that data strobe signals DSTBP[3:0] and DSTBN[3:0] are provided to indicate validity of their corresponding doublewords on the DATA[63:0] signals, to wait 1 cycle of BCLK[1:0] before sampling is disadvantageous from a performance standpoint.

The dynamic source synchronized sampling adjust logic 102, which is implemented according to an embodiment of the present invention, overcomes the above noted problems and limitations by dynamically adjusting the sampling time for signals on the system bus 105 for which the source synchronous strobes are provided. For teaching purposes, a subset of the signals discussed with reference to FIGS. 1 and 2 is illustrated, however, one skilled in the art will appreciate that the principles taught herein apply to all signals shown in FIGS. 1 and 2 and extend beyond that to substantially similar source synchronous signals employed to drive address and control signals as well. The apparatus and methods are employed within a microprocessor or integrated circuit that is required to interface to other devices over a source synchronous system bus. The x86-compatible bus protocol is illustrated for purposes of teaching where it is understood that the present invention applies in an analogous manner to other bus protocols.

Figure 3:
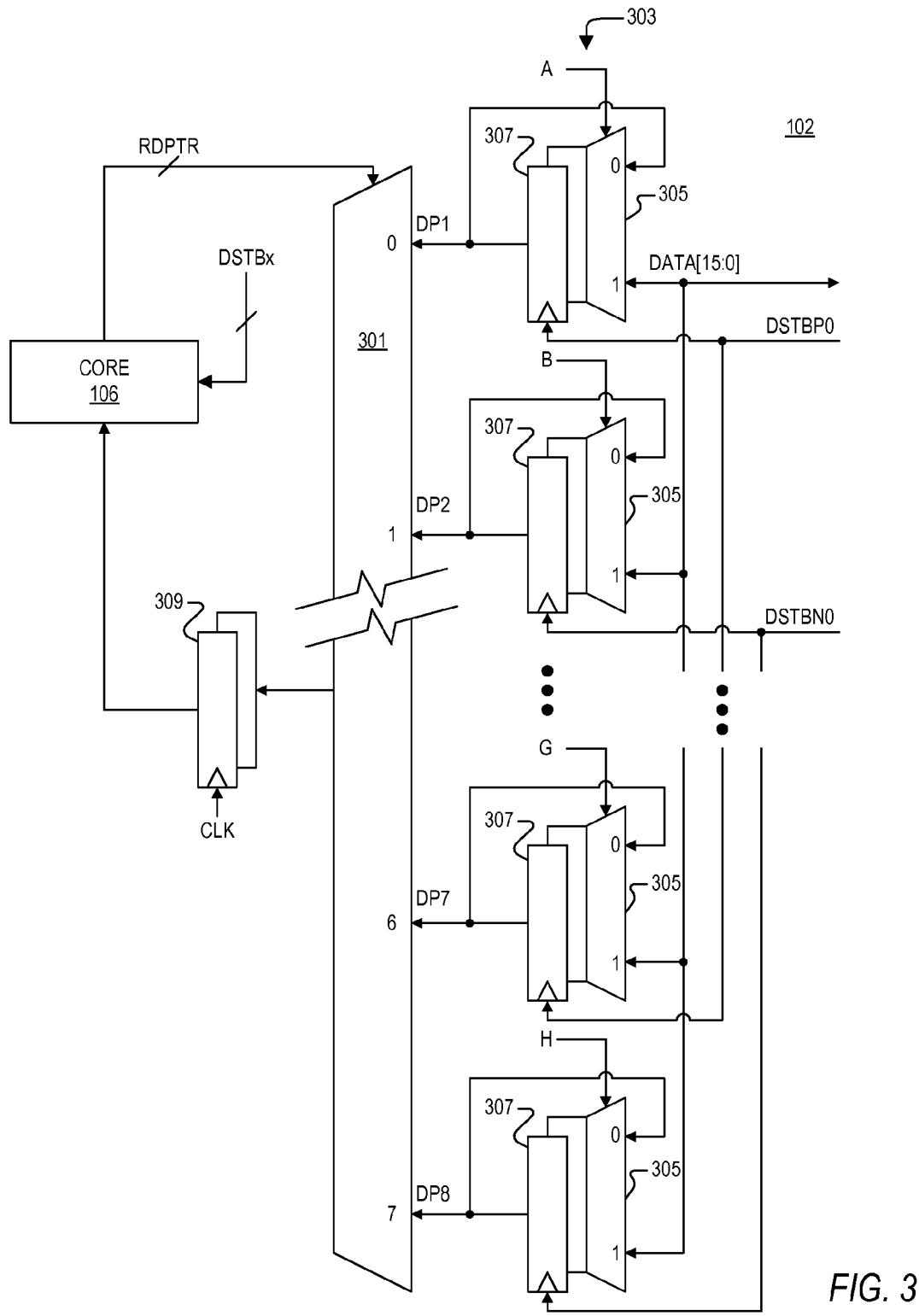
FIG. 3 is a block diagram illustrating the dynamic source synchronized sampling adjust logic of FIG. 1 implemented according to an exemplary embodiment of the present invention for providing sampled data to the microprocessor core of FIG. 1.

FIG. 3 is a block diagram illustrating the dynamic source synchronized sampling adjust logic 102 implemented according to an exemplary embodiment of the present invention for providing sampled data to the microprocessor core 106. Although illustrated as incorporated within the microprocessor 101, it is understood that similar dynamic source synchronized sampling adjust logic may be employed in any integrated circuit (IC) device, including the bus agent 103, that communicates over a system bus, such as the system bus 105, with other devices to exchange data. In this example, the data is received by the microprocessor 101 from the system bus 105 via the DATA[15:0] signals, which are indicated as being valid on the system bus 105 via source synchronous data strobes signals DSTBP0, DSTBN0 that are asserted by the bus agent 103 that is sending the data. According to protocol, shortly after the bus agent 103 drives the DATA[15:0] signals to the system bus 105 (and within the same cycle of BCLK[1:0]), it asserts DSTBP0 to indicate that the states of the DATA[15:0] signals that are valid for data packets 1, 3, 5, and 7. The bus agent 103 asserts the DSTBN0 signal to indicate that the states of the DATA[15:0] signals are valid for data packets 2, 4, 6, and 8. The dynamic source synchronized sampling adjust logic 102 ensures that there is no need to wait until the next cycle of BCLK[1:0] to sample the data packets on the DATA[15:0] signals.

To accomplish source synchronous sampling, dynamic source synchronized sampling adjust logic is shown. In this embodiment, which is configured to sample data packets asserted on the DATA[15:0] signals associated with the quad-pumped bus transaction, an 8-to-1 multiplexer (MUX) 301 is provided having data inputs 0-7. The DATA[15:0] signals are routed to a series of eight muxed-input registers 303. For purposes of clarity and simplification, only the first two and the last two of the series of eight muxed-input registers 303 are shown. Each muxed-input register 303 includes a 2:1 MUX 305 coupled to a register 307. Each MUX 305 has a first data input receiving the DATA[15:0] signals, a second data input receiving a corresponding one of a series of eight latched data packets DP1-DP8 from a data output of a corresponding one of the registers 307, a data output coupled to the data input of a corresponding one of the registers 307, and a select input receiving a corresponding one of a series of eight select signals A, B, C, D, E, F, G, and H (or A-H). Each data input and output of each MUX 305 and each register 307 includes multiple data signals, e.g., [15:0], corresponding to the particular size of each data packet in the illustrated configuration. Alternatively, each MUX 305 and each register 307 represent multiple devices for processing multiple bits as understood by those skilled in the art. The select input of the first MUX 305 receives signal A, the select input of the second MUX 305 receives signal B, and so on up to the second-to-last MUX 305, which receives signal G at its select input and the last MUX 305, which receives signal H at its select input. Each MUX 305 is configured so that it selects the data packet from the DATA[15:0] signals when its select input as asserted high to a logic one (1), and selects a corresponding one of the latched data packets DP1-DP8 when its select input is asserted low to a logic zero (0).

Each register 307 has a data input coupled to a data output of a corresponding MUX 305, a data output providing a corresponding one of the latched data packets DP1-DP8, and a clock input. Each of the latched data packets DP1-DP8 is provided to a respective one of the data inputs 0-7 of the MUX 301 (receiving multiple signals or bits for each input) and to a second input of a respective one of the MUXs 305. The DSTBP0 signal clocks the four registers 307 providing the latched data packets DP1, DP3, DP5 and DP7 to the 0, 2, 4, and 6 inputs, respectively, of the MUX 301. The DSTBN0 signal clocks the four registers 307 providing the latched data packets DP2, DP4, DP6 and DP8 to the 1, 3, 5, and 7 inputs of the MUX 301. A set of read pointer signals RDPTR is provided by the microprocessor core 106 to the select input of the MUX 301 to select individual data packets in order to pass selected sampled data to the microprocessor core 106. The output of the MUX 301 is provided to the data input of a register 309, which receives a core clock signal CLK at its clock input, and which provides selected data to the microprocessor core 106.

In operation, the A-H select signals, which are derived from the data strobe signals DSTBP0 and DSTBP1 as further described below, are each asserted high at the appropriate time to select a corresponding one of the data packets 1-8 from the DATA[15:0] signals as inputs to the registers 307 according to the count of a quadword transfer. The data strobe signals DSTBP0 and DSTBP1 clock the registers 307 to latch selected data packets 1-8 from the respective MUXs 305 to provide the corresponding latched data packets DP1-DP8. When each of the A-H select signals are asserted low, the corresponding one of the latched data packets DP1-DP8 is fed back to the corresponding MUX 305 to hold the data for the MUX 301 during successive assertions of the data strobe signals (asserted to latch subsequent data packets from the DATA bus). The microprocessor core 106 receives at least one up to all of the data strobe signals, shown collectively as signals DSTBx, which inform the microprocessor core 106 of the quadword transfer. The microprocessor core 106 asserts the RDPTR signals to select and provide the latched data packets DP1-DP8 to the register 309, which provides selected data to the microprocessor core 106 synchronous with the CLK signal. It is noted that a muxed-input register 303 is provided for each data packet asserted on the DATA bus during the data phase of a quad-pumped data transaction, so that the data packets may remain latched and thus stored therein for as long as necessary without data loss even after the data cycle is completed. The muxed-input register 303 should be cleared, however, before the data phase of a subsequent quad-pumped data transaction. In one embodiment, the microprocessor core 106 employs the RDPTR signals to begin transfer of the received data as soon as each of the muxed-input registers 303 has been enabled by the respective A-H select signals.

In one embodiment, the data strobes DSTBP0, DSTBN0 are synchronized to the core clock signal CLK of the microprocessor 101. Accordingly, the microprocessor core 106 looks for a transition on the data strobes DSTBP0, DSTBN0, which indicates that a data packet on the DATA[15:0] signals has been clocked into a corresponding one of the registers 307. When a transition is detected, the sampling point for that data packet is established. The dynamic source synchronized sampling adjust logic 102 shown is for capturing the data packets 1-8 asserted on the data subgroup 0 of the DATA bus during successive beats during the quad-pumped transaction. The logic is repeated for capturing the data packets asserted on each of the remaining data subgroups 1-3 of the DATA bus.

Figure 4:
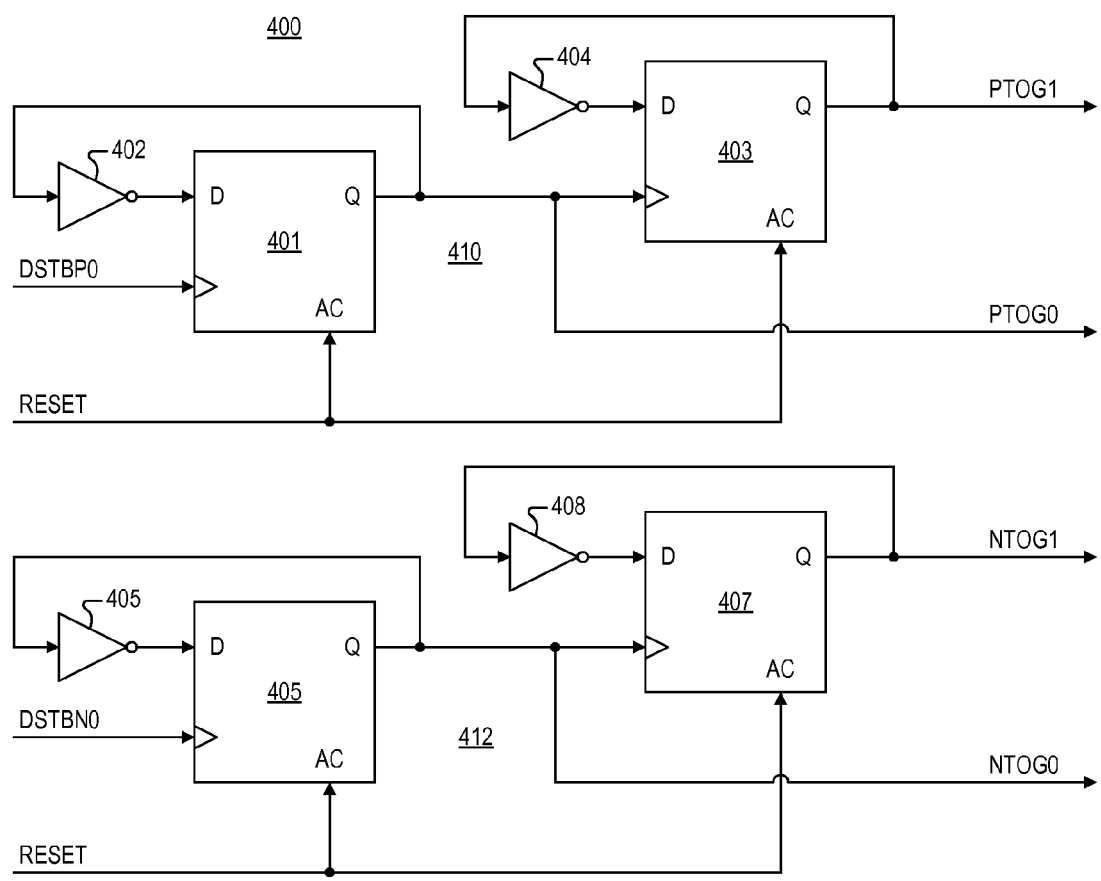
FIG. 4 is a block diagram illustrating timing signal generation logic implemented according to an exemplary embodiment of the present invention for generating timing signals used for generating corresponding select signals.

FIG. 4 is a block diagram illustrating timing signal generation logic 400 implemented according to an exemplary embodiment of the present invention for generating timing signals used for generating the select signals A-H. In the illustrated embodiment, the timing signal generation logic 400 generates timing signals PTOG0 and PTOG1 based on the DSTBP0 signal and generates timing signals NTOG0 and NTOG1 based on the DSTBN0 signal. The PTOG0, PTOG1, NTOG0 and NTOG1 timing signals are used to derive the select signals A-H as further described below. The DSTBP0 signal is provided to the clock input of a D-type flip-flop (DFF) 401, having a Q output providing the PTOG0 signal, which is provided to the input of an inverter 402 and to the clock input of another DFF 403. The output of the inverter 402 is provided to the D input of the DFF 401. The Q output of the DFF 403 provides the PTOG1 signal, which is provided to the input of another inverter 404, having its output coupled to the D input of the DFF 403. A reset signal RESET is provided to asynchronous clear inputs AC of the DFFs 401 and 403. In this manner, the DFFs 401 and 403 form a sequential DFF circuit 410 to count cycles of the DSTBP0 signal during a quad-pumped data transfer cycle over the system bus 105. Another pair of DFFs 405 and 407 and inverters 406 and 408 are provided to form another sequential DFF circuit 412 to count cycles of the DSTBN0 signal in substantially the same manner.

During each quad-pumped data transfer cycle, the PTOG [1:0] and NTOG[1:0] signals are asserted to sequential states to effectively "count" associated sequential cycles of the DSTBP0 and DSTBN0 signals, respectively. In particular, the collective states of each of the PTOG[1:0] and NTOG[1:0] signals are updated with each rising edge of the DSTBP0 signal according to the following logic counting sequence: 00, 11, 01, 10, 00, 11, 01, and so on.

Figure 5:
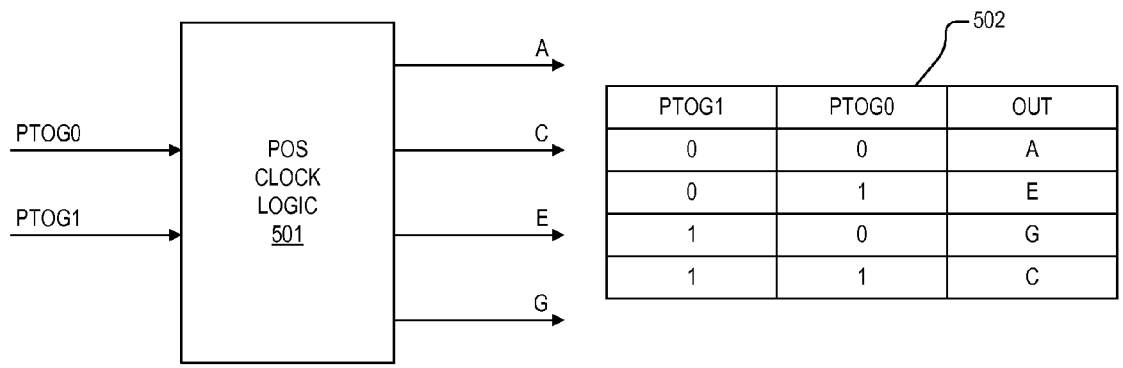
FIG. 5 is a block diagram illustrating select signal generation logic implemented according to an exemplary embodiment of the present invention for generating the select signals based on the timing signals.
Figure 5:
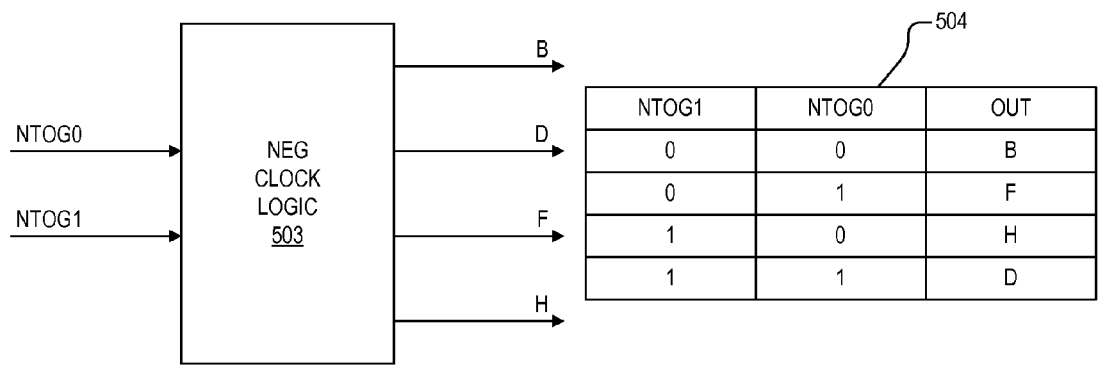

FIG. 5 is a block diagram illustrating select signal generation logic 500 implemented according to an exemplary embodiment of the present invention for generating the select signals A-H based on the PTOG[1:0] signals and the NTOG [1:0] signals. The PTOG[1:0] signals are provided to a POS clock logic circuit 501, which provides the A, C, E and G signals. A truth table 502 indicates when the A, C, E, and G signals are asserted by the POS clock logic circuit 501 based on the PTOG[1:0] signals. Given the sequence provided above for the PTOG[1:0] signals, the POS clock logic 501 asserts the select signals in the order: A, C, E and G. In a similar manner, the NTOG[1:0] signals are provided to a NEG clock logic circuit 503, which provides the B, D, F and H signals. A truth table 504 indicates when the B, D, F and H signals are asserted by the NEG clock logic circuit 503 based on the NTOG[1:0] signals. Given the sequence provided above for the NTOG[1:0] signals, the NEG clock logic 503 asserts the select signals in the order: B, D, F and H. As shown in FIG. 2, the assertions of the DSTBP0 and DSTBN0 signals are alternated with respect to each other, so that the select signals A-H are asserted in sequential order to select and latch the data packets 1-8 in sequential order and to provide the latched data packets DP1-DP8 in sequential order to the MUX 301. The muxed-input registers 303, the timing signal generation logic 400 and the select signal generation logic 500 collectively form sampling logic for selecting and latching each data packet provided on the DATA bus during the data phase of a quad-pumped data transaction.

An advantage of the present invention is that performance is increased in a microprocessor or integrated circuit because a mechanism according to an embodiment of the present invention senses when data strobes are being driven by the sending device, and adjusts when data is provided to the core as a function of when each strobe is asserted by the sending device. Thus, a one-cycle delay of providing data to the microprocessor core is precluded.

Although the present invention has been described in considerable detail with reference to certain preferred versions thereof, other versions and variations are possible and contemplated. For example, a dynamic source synchronized sampling adjust system as described herein may be responsive to a single data strobe signal, to multiple data strobe signals including at least one for each data subgroup, or to a positive data strobe and a negative data strobe provided for the entire data bus or for each data subgroup. Furthermore, the logic described herein may be implemented using positive or negative logic or any combination thereof. Any number of the functions described for the logic circuits may be implemented in software or firmware within an integrated device. Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A dynamic source synchronized sampling adjust system for sampling a plurality of data packets distributed among a plurality of sequential data beats on a data bus during each of at least one cycle of a bus clock, wherein at least one data strobe is provided indicating validity of each of the plurality of data packets, said dynamic source synchronized sampling adjust system comprising:

a plurality of first multiplexers, each having a first input for coupling to the data bus, a second input receiving a corresponding one of a plurality of latched data packets, a select input receiving a corresponding one of a plurality of select signals, and an output;

a plurality of registers, each having an input coupled to an output of a corresponding one of said plurality of first multiplexers, an output providing a corresponding one of said plurality of latched data packets, and a clock input for receiving the at least one data strobe;

at least one second multiplexer having a plurality of inputs coupled to corresponding outputs of said plurality of registers, an output providing a selected one of said plurality of latched data packets, and a select input receiving a read pointer; and timing logic having at least one input for receiving the at least one data strobe and a plurality of outputs providing said plurality of select signals.

2. The dynamic source synchronized sampling adjust system of claim 1, wherein said plurality of first multiplexers and said plurality of registers comprises a plurality of muxed-input registers, wherein each of said plurality of muxed-input registers latches a corresponding one of the plurality of data packets provided on the data bus.

3. The dynamic source synchronized sampling adjust system of claim 1, wherein said timing logic provides a corresponding one of said plurality of select signals to a corresponding one of said plurality of first multiplexers when a corresponding one of the plurality of data packets is indicated as valid by the at least one data strobe.

4. The dynamic source synchronized sampling adjust system of claim 1, wherein the data bus is subdivided into a plurality of subgroups, wherein the plurality of data packets are further distributed among the plurality of data bus subgroups, and wherein the at least one data strobe comprises at least one data strobe for each of the plurality of data bus subgroups, and wherein said timing logic comprises:

a plurality of sequential timing circuits, each having an input receiving a corresponding data strobe and a plurality of outputs providing a corresponding subset of said plurality of select signals, wherein each select signal of said corresponding subset of said plurality of select signals is provided to a corresponding one of said plurality of first multiplexers for selecting a corresponding one of the plurality of data packets.

5. The dynamic source synchronized sampling adjust system of claim 1, wherein the at least one data strobe comprises a positive data strobe and a negative data strobe, and wherein said timing logic comprises:

a first sequential timing circuit having an input for receiving the positive data strobe and a plurality of outputs providing a first subset of said plurality of select signals to first alternate ones of said plurality of first multiplexers for selecting first alternate ones of the plurality of data packets; and a second sequential timing circuit having an input receiving the negative data strobe and a plurality of outputs providing a second subset of said plurality of select signals to second alternate ones of said plurality of first multiplexers for selecting second alternate ones of the plurality of data packets.

6. The dynamic source synchronized sampling adjust system of claim 1, wherein said timing circuit comprises a plurality of sequentially coupled flip-flops which advance through a sequential series of logic states in response to each operative edge of the at least one data strobe and which provides a corresponding one of said plurality of select signals for each of said logic states.

7. The dynamic source synchronized sampling adjust system of claim 1, further comprising:
a core register having an input coupled to said output of said at least one second multiplexer, an output providing synchronized latched data packets, and a clock input receiving a core clock signal; and
wherein said read pointer is synchronized with said core clock signal.

8. An integrated device for sampling a plurality of data packets asserted sequentially on a system bus during each of at least one cycle of a bus clock signal, the system bus including at least one data strobe signal indicating validity of each data packet, the device comprising:
a clock input for receiving the bus clock signal;
a data bus interface for receiving the plurality of data packets and for detecting the at least one data strobe signal; and
dynamic source synchronized sampling adjust logic, comprising:
sampling logic, coupled to the data bus interface, which selects and latches each of the plurality of data packets in response to the at least one data strobe signal and which provides a plurality of latched data packets; and
select logic, coupled to said sampling logic, which selects from among said plurality of latched data packets based on a read pointer.

9. The integrated device of claim 8, wherein said sampling logic comprises:
a plurality of multiplexers, each having a first input coupled to said data bus interface, a second input receiving a corresponding one of said plurality of latched data packets, and a select input receiving a corresponding one of a plurality of select signals;
a plurality of registers, each having an input coupled to an output of a corresponding one of said plurality of multiplexers, an output providing a corresponding one of said plurality of latched data packets, and a clock input for receiving the at least one data strobe signal; and
timing logic having an input for receiving the at least one data strobe signal and a plurality of outputs for providing said plurality of select signals.

10. The integrated device of claim 9, wherein said timing logic comprises a plurality of sequential flip-flops for detecting edges of the at least one data strobe signal.

11. The integrated device of claim 10, wherein said timing logic comprises:
a first D-type flip-flop having a clock input for receiving the at least one data strobe signal, a data output for providing a first timing signal, and a data input;
a first inverter having an input coupled to said data output of said first D-type flip-flop and an output coupled to said data input of said first D-type flip-flop;

a second D-type flip-flop having a clock input coupled to said data output of said first D-type flip-flop, a data output for providing a second timing signal, and a data input;
a second inverter having an input coupled to said data output of said second D-type flip-flop and an output coupled to said data input of said second D-type flip-flop; and
clock logic having respective inputs receiving said first and second timing signals and a plurality of outputs providing said plurality of select signals.

12. The integrated device of claim 9, wherein the at least one data strobe signal comprises a first data strobe signal indicating validity of a first and every other subsequent one of the plurality of data packets asserted sequentially on the system bus and a second data strobe signal indicating validity of a second and every other subsequent one of the plurality of data packets asserted sequentially on the system bus, wherein said timing logic comprises:
first clock logic for receiving the first data strobe signal and for providing a first subset of said plurality of select signals for selecting the first and every other subsequent one of the plurality of data packets asserted sequentially on the system bus; and
second clock logic for receiving the second data strobe signal and for providing a second subset of said plurality of select signals for selecting the second and every other subsequent one of the plurality of data packets asserted sequentially on the system bus.

13. The integrated device of claim 8, further comprising:
said select logic comprising a multiplexer having a plurality of inputs coupled to receive said plurality of latched data packets, an output providing selected latched data packets, and a select input receiving said read pointer; and
a core register having an input coupled to said output of said multiplexer, an output providing synchronized data packets, and a clock input receiving a core clock signal;
wherein said read pointer is synchronized with said core clock signal.

14. A method of sampling a plurality of data packets asserted sequentially on a data bus for each of at least one cycle of a bus clock signal, the data bus including at least one data strobe signal indicating validity of each data packet, the method comprising:
receiving the bus clock signal and the plurality of data packets;
detecting operative edges of the at least one data strobe signal;
first employing sampling logic to select and latch each of the plurality of data packets in response to the at least one data strobe signal and providing a plurality of latched data packets; and
second employing select logic that is coupled to the sampling logic, to select from among the plurality of latched data packets based on a read pointer.

15. The method of claim 14, wherein said detecting operative edges of at least one data strobe signal comprises clocking sequential logic through a plurality of logic states.

16. The method of claim 15, wherein said comprising:
asserting a corresponding one of a plurality of select signals for each of the plurality of logic states; and providing each of the plurality of select signals to a select input of a corresponding one of a plurality of multiplexers coupled to the data bus.

17. The method of claim 14, wherein said comprises clocking a corresponding one of a plurality of registers with the at least one data strobe signal.

18. The method of claim 14, wherein the plurality of data packets are distributed among a plurality of subgroups of the data bus and among a plurality of sequential data beats for the at least one cycle of the bus clock, and wherein said detecting operative edges of at least one data strobe signal comprises detecting operative edges of a plurality of data strobe signals including at least one data strobe signal for each of the plurality of subgroups of the data bus.

19. The method of claim 14, wherein:
said detecting operative edges of the at least one data strobe signal comprises detecting operative edges of a positive data strobe signal and a negative data strobe signal; and
wherein said second employing comprises clocking first sequential logic with the positive strobe signal and clocking second sequential logic with the negative strobe signal.

20. The method of claim 14, further comprising:
selecting at least one of the plurality of latched data packets; and
synchronously latching the at least one of the plurality of latched data packets with a core clock signal.

* * * * *